United States Patent [19]
Caldwell

[11] Patent Number: 5,860,389
[45] Date of Patent: Jan. 19, 1999

[54] PET BED WITH A DETACHABLE, WASHABLE SLEEPING SURFACE

[76] Inventor: Terry Caldwell, 10110 Talleyran Dr., Austin, Tex. 78750

[21] Appl. No.: 946,238

[22] Filed: Oct. 7, 1997

[51] Int. Cl.⁶ .................................................. A01K 29/00
[52] U.S. Cl. ............................................. 119/28.5; 5/655
[58] Field of Search .................................. 119/28.5, 725, 119/727, 728; 5/655, 627

[56] References Cited

U.S. PATENT DOCUMENTS

| | | |
|---|---|---|
| D. 333,537 | 2/1993 | Muse . |
| D. 369,885 | 5/1996 | Zeiler . |
| D. 377,545 | 1/1997 | Iben . |
| 2,900,956 | 8/1959 | Hoffman ................................ 119/28.5 |
| 3,814,058 | 6/1974 | Thompson . |
| 3,989,008 | 11/1976 | Neumann ............................... 119/28.5 |
| 4,459,712 | 7/1984 | Pathan . |
| 4,729,343 | 3/1988 | Evans . |
| 4,788,934 | 12/1988 | Fetter . |
| 5,000,116 | 3/1991 | Fife et al. . |
| 5,119,763 | 6/1992 | Crabtree . |
| 5,133,294 | 7/1992 | Reid . |
| 5,213,060 | 5/1993 | Sloan et al. . |
| 5,265,289 | 11/1993 | Swiger et al. ........................... 5/655 X |
| 5,509,373 | 4/1996 | Elesh ...................................... 119/28.5 |
| 5,566,407 | 10/1996 | Lien ....................................... 5/655 X |
| 5,588,393 | 12/1996 | Hellborn . |
| 5,722,100 | 3/1998 | Jozwiak .................................. 5/655 X |

*Primary Examiner*—Michael J. Carone
*Assistant Examiner*—James S. Bergin
*Attorney, Agent, or Firm*—Haynes and Boone, L.P.; James R. Bell

[57] ABSTRACT

A pet bed includes a frame having a leg portion and a detachable portion. A support surface is attached to the frame and is suspended by the frame in an elevated position. The detachable portion is inserted through an edge portion of the support surface. The edge portion of the support surface extends from the detachable portion of the frame and overlaps the leg portion of the frame for forming a skirt which covers the detachable portion of the frame and a portion of each of the legs.

15 Claims, 2 Drawing Sheets

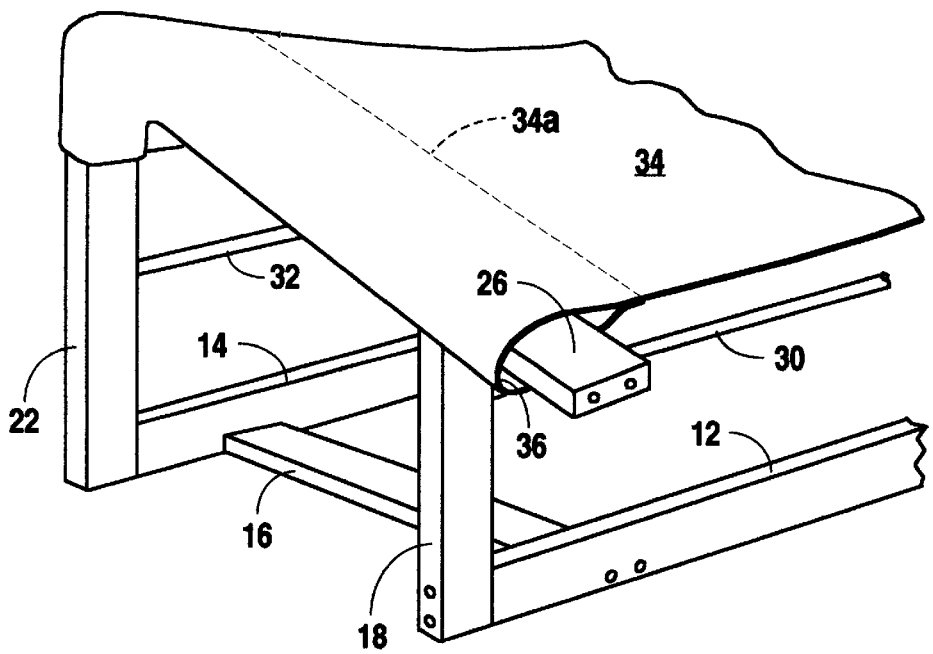
Fig. 3
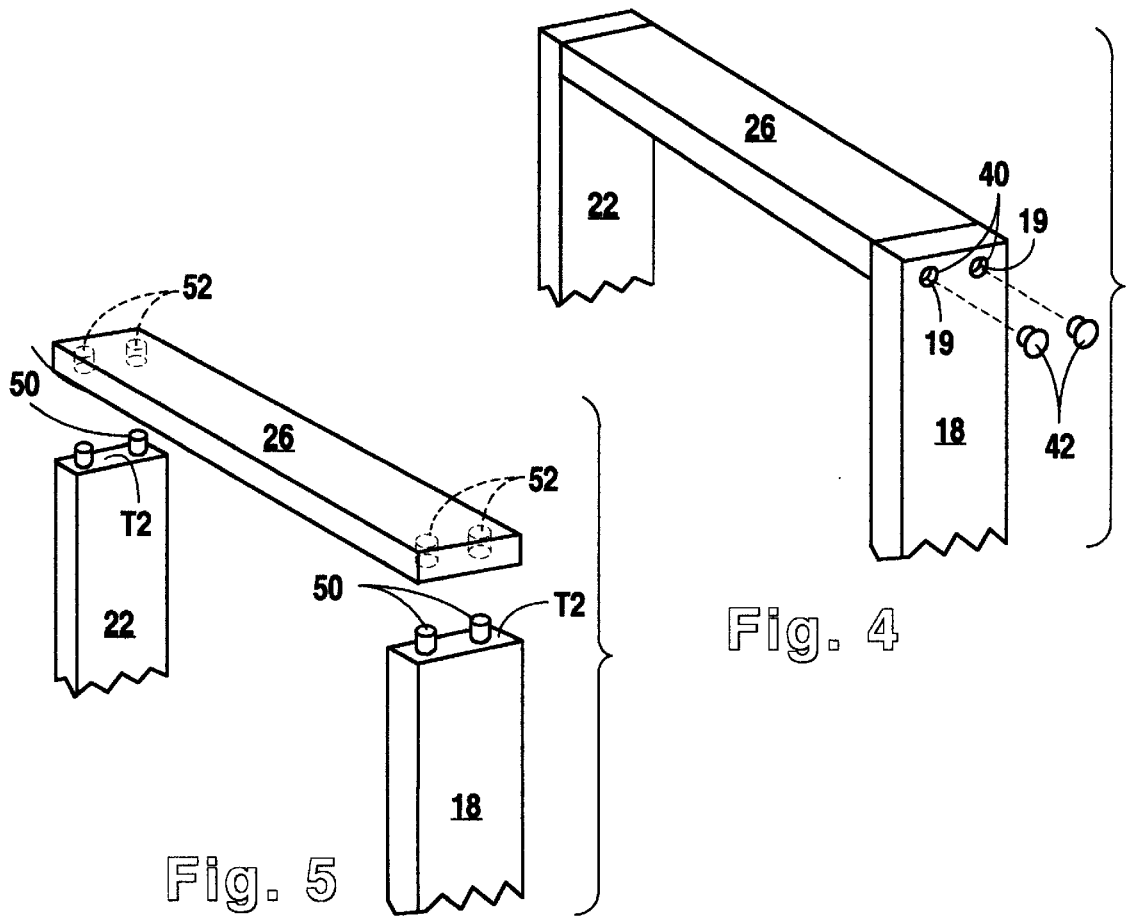
Fig. 4
Fig. 5

PET BED WITH A DETACHABLE, WASHABLE SLEEPING SURFACE

BACKGROUND

The disclosures herein relate generally to pet beds and more particularly to a pet bed having an aesthetically pleasing base and a detachable, washable sleeping surface.

Animals by nature, like to sleep in an environment of warmth and security. Cats, in particular, like to sleep on an elevated surface, i.e. a surface that does not rest directly on the floor. Also, cats prefer a soft, fluffy rest surface.

One device has been provided which includes a wood frame which supports a fabric rest surface in an elevated position. Another device is a bunk bed style hammock which includes a plastic frame supporting one or more fabric rest surfaces in a stacked elevated position.

It is highly desirable that such devices be aesthetically pleasing so that, in addition to being functional, they can be placed in the home and appear to fit in with home furnishings and other surroundings. It is also desirable that the fabric sleeping surface be washable and easily removable and replaceable. In addition, the rest surface should preferably be of a material or substance which comforts the animal in a natural way.

Therefore, what is needed is a pet bed which has an elevated rest surface formed of a soft, fluffy material. The rest surface must be washable and therefore easily detachable and replaceable with the support frame. The bed also should be aesthetically pleasing so as to fit in with home furnishings and other domestic surroundings.

SUMMARY

One embodiment, accordingly, provides a pet bed which has the appearance of a piece of household furniture, which offers the comforts most desired by the pet and which is easily kept clean by the pet owner. To this end, a pet bed includes a frame and a support surface attached to the frame and suspended in an elevated position. A first portion of the frame is inserted through an edge portion of the support surface. The edge portion of the support surface extends from the first portion of the frame and overlaps a second portion of the frame.

A principal advantage of this embodiment is that it provides all the features that are beneficial to both the pet and the pet owner. The rest surface is soft, easily removable and replaceable, washable and provides a skirt to shroud a portion of the frame.

BRIEF DESCRIPTION OF THE DRAWINGS

FIG. 3 is a partial isometric view illustrating an embodiment of the assembly and disassembly of the support surface and frame.

FIG. 4 is a partial isometric view illustrating an embodiment of a first frame portion detachably connected to a second frame portion.

FIG. 5 is a partial isometric view illustrating another embodiment of a first frame portion detachably connected to a second frame portion.

DETAILED DESCRIPTION OF THE PREFERRED EMBODIMENT

Figure 1:
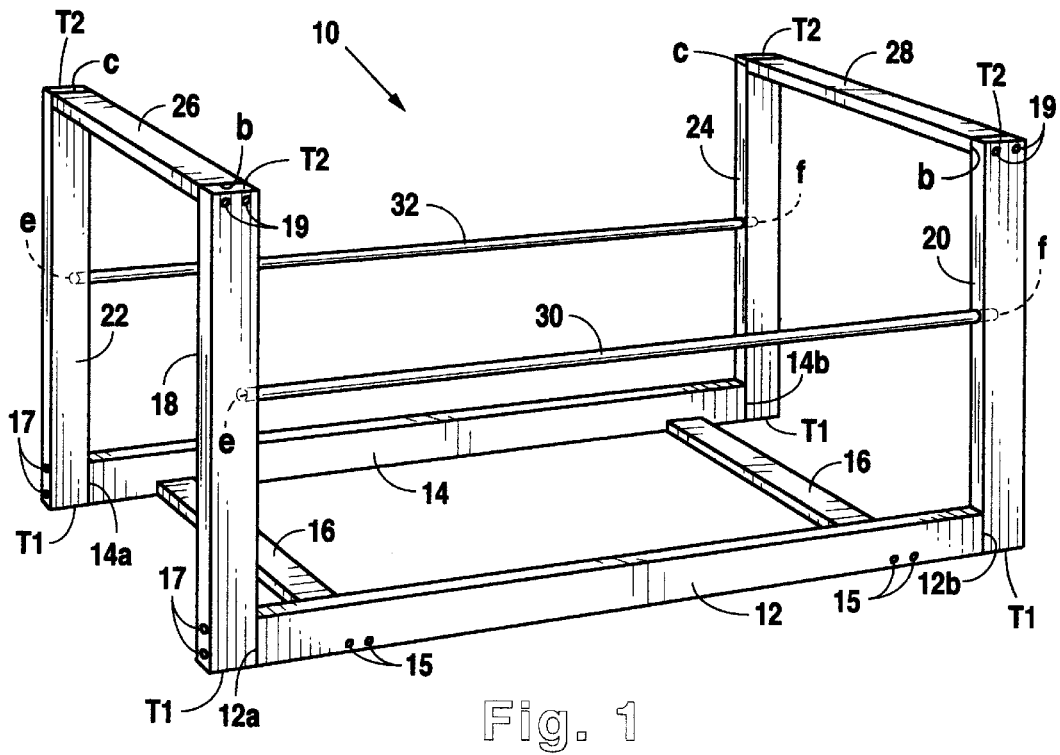
FIG. 1 is an isometric view illustrating an embodiment of a frame for a pet bed.

A rigid pet bed frame is generally designated 10 in FIG. 1 and includes a base member 12 having a pair of opposite ends 12a, 12b, and another base member 14 having a pair of opposite ends 14a, 14b. Base members 12, 14 are maintained substantially parallel and spaced apart by a pair of spacers 16 each connected at their opposite ends to base members 12, 14 by screws 15 or other suitable fasteners.

End 12a of base member 12 is connected to an end T1 of a perpendicularly disposed leg 18 by screws 17 or other suitable fastener. Similarly, end 12b of base member 12 is connected to an end T1 of a leg 20. Also, ends 14a, 14b of base member 14 are each connected to an end T1 of a leg 22 and a leg 24, respectively.

Another end T2 of leg 18 is connected to an end b of a perpendicularly disposed cross member 26 by screws 19 or other suitable fastener. Similarly, an end T2 of leg 22 is connected to an end c of cross member 26. Also, ends T2 of members 20 and 24 are each connected to opposite ends b and c of another cross member 28.

A stabilizing rod 30 is attached at opposite ends e and f to legs 18 and 20, respectively. Preferably ends e and f are inserted into legs 18 and 20 and secured by a suitable adhesive. Another stabilizing rod 32 is attached at opposite ends e and f to legs 22 and 24, respectively, in a similar manner.

Figure 2:
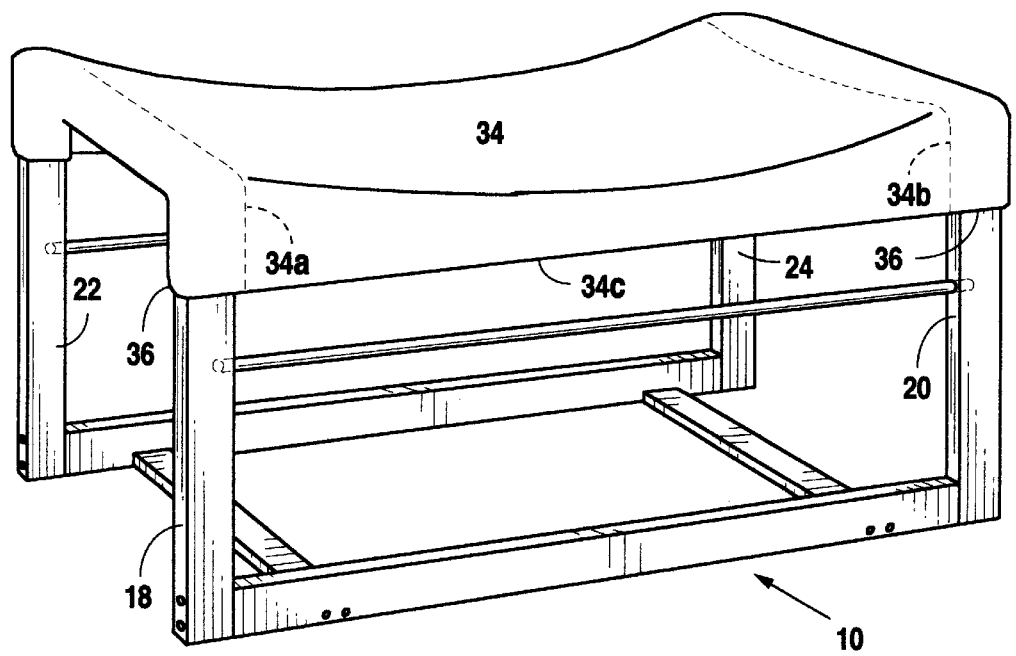
FIG. 2 is an isometric view illustrating an embodiment of the frame having a support surface attached thereto.

A flexible, washable support surface 34, FIGS. 2 and 3, is attached to frame 10 and suspended in an elevated position. A synthetic fur material is preferred for surface 34. Support surface 34 includes a loop 36 formed therein at each opposite end 34a, 34b of surface 34. Loop 36 is formed by folding over and attaching the ends 34a, 34b to the support surface 34. Loops 36 are of a size sufficient to insert cross member 26 therethrough adjacent end 34a, as shown in FIG. 3, and cross member 28 therethrough adjacent end 36a (not shown).

Support surface 34 is of a size sufficient to overhang frame 10, FIG. 2, so as to provide a skirt portion 34c of surface 34 which covers a portion of frame 10. This is accomplished by each loop 36 being of a length sufficient to cover cross member 26 and extend over a portion of the associated pair of leg members 18, 22 at end 34a, and to cover cross member 28 and extend over a portion of the associated pair of leg members 20, 24 at end 34b.

In FIG. 4, one type of connection is illustrated between leg members 18 and 22 and the cross member 26, such as by having the screws 19 extend through leg member 18 into cross member 26. Also, the preferred finished wood construction of each of the frame members, i.e. stained wood finish, is aesthetically pleasing and to enhance the finished look, it is possible to countersink screws 19 into a screw opening 40 and then cap each screw 19 with a similarly stained dowel plug 42 press-fit into opening 40. Such plugs 42 can be used in connection with all screw connections of frame 10.

As an alternative, FIG. 5 illustrates that a pair of tapered dowel extensions 50 may be suitable attached to extend from ends T2 of legs 18, 22 and received by an aligned pair of openings 52 formed in cross member 26. This arrangement obviates the need to remove a fastener for detaching cross member 26 from legs 18, 22. Also, the same arrangement can be applied for connecting cross member 28 to legs 20, 24.

In operation, surface 34 is supported on frame 10 by detaching cross member 26 from legs 18, 22 and inserting member 26 through loop 36 at end 34a of surface 34. Member 26 is then re-attached to legs 18, 22. Because loop 36 and the corresponding width of surface 34 are greater than the length of cross member 26, a portion of loop 36 at end 34a is extended over a portion of each leg 18, 22. Similarly, cross member 28 is detached from legs 20, 24 and inserted through loop 36 at end 34b of surface 34. Member 28 is then re-attached to legs 20, 24. Also, because loop 36 and the corresponding width of surface 34 are greater than the length of cross member 28, a portion of loop 36 at end 34b is extended over a portion of each leg 20, 24. In this manner, loops 36 cover cross members 26, 28 and also form skirt 34c which covers a portion of legs 18, 20, 22 and 24.

Removal of surface 34 from frame 10 includes gathering loop 36 at end 34a as required to detach cross member 26 from legs 18, 22 and removing cross member 26 from loop 36. Also, loop 36 at end 34b is gathered as required to detach cross member 28 from legs 20, 24 and cross member 28 is removed from loop 36. This permits easy removal and installation of surface 34 from frame 10 as required for washing.

As it can be seen, the principal advantages of these embodiments are that the support surface 34 is soft, easily removable, replaceable and washable, and provides a skirt to shroud a portion of the frame. Furthermore, the finished, stained wood members of the frame are aesthetically pleasing so as to fit in with home furnishings and other domestic surroundings.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pet bed comprising:
   a frame including a plurality of legs connected to a plurality of cross members;
   a support surface including loops attached to the cross members and suspended by the legs in an elevated position;
   the cross members of the frame being inserted through the loops of the support surface; and
   the loops extending from the cross members and overlapping a portion of the legs providing a skirt to cover the portion of the legs.

2. The pet bed as defined in claim 1 wherein the frame includes opposite ends and a pair of legs at each opposite end.

3. The pet bed as defined in claim 2 wherein the cross members are detachable from the frame.

4. The pet bet as defined in claim 1 wherein the frame includes a first cross member attached to a first pair of legs and a second cross member attached to a second pair of legs.

5. The pet bed as defined in claim 4 wherein the skirt extends between the first and second pair of legs.

6. The pet bed as defined in claim 1 wherein the support surface is removable from the frame.

7. The pet bed as defined in claim 6 wherein the support surface is formed of a washable material.

8. The pet bed as defined in claim 6 wherein the support surface is formed of a washable, synthetic fur material.

9. A pet bed comprising:
   a frame having a plurality of legs and a plurality of detachable cross members;
   a support surface including loops attached to the cross members and suspended by the legs in an elevated position;
   the detachable cross members being inserted through the loops of the support surface; and
   the loops extending from the detachable cross members and overlapping the legs providing a skirt to cover a portion of the legs.

10. The pet bed as defined in claim 9 wherein the frame comprises a base having opposite ends and a pair of legs at each opposite end.

11. The pet bed as defined in claim 10 wherein the detachable cross members include a first member attached to a first pair of the legs and a second member attached to a second pair of the legs.

12. The pet bed as defined in claim 11 wherein the skirt extends between the first and second pair of legs.

13. The pet bed as defined in claim 9 wherein the support surface is formed of a washable, synthetic fur material.

14. The pet bed as defined in claim 9 wherein the frame is formed of a finished wood material.

15. A method of attaching an elevated support surface to a frame comprising the steps of:
   detaching a first cross member from a first pair of legs of the frame;
   inserting the first cross member through a loop at a first end portion of the support surface;
   detaching a second cross member from a second pair of legs of the frame;
   inserting the second cross member through a loop at a second end portion of the support surface;
   re-attaching the first and second cross members, respectively, to the first and second pair of legs of the frame; and
   extending the loops at the first and second end portions to cover a portion of each pair of legs.

* * * * *

UNITED STATES PATENT AND TRADEMARK OFFICE
CERTIFICATE OF CORRECTION

PATENT NO. : 5,860,389
DATED : January 19, 1999
INVENTOR(S) : Terry Caldwell

It is certified that error appears in the above-identified patent and that said Letters Patent is hereby corrected as shown below:

Column 3, line 51, "bet" should be -- bed --.

Signed and Sealed this

Twenty-second Day of June, 1999

Attest:

Q. TODD DICKINSON

*Attesting Officer*  *Acting Commissioner of Patents and Trademarks*